United States Patent
Chun et al.

(10) Patent No.: US 8,804,602 B2
(45) Date of Patent: Aug. 12, 2014

(54) METHOD AND APPARATUS FOR TRANSMITTING FRAME IN WIRELESS COMMUNICATION SYSTEM INCLUDING RELAY STATION

(75) Inventors: Jin Young Chun, Anyang-si (KR); Han Gyu Cho, Anyang-si (KR); Jin Sam Kwak, Anyang-si (KR); Dong Guk Lim, Anyang-si (KR); Bin Chul Ihm, Anyang-si (KR); Young Soo Yuk, Anyang-si (JP)

(73) Assignee: LG Electronics Inc., Seoul (KR)

( * ) Notice: Subject to any disclaimer, the term of this patent is extended or adjusted under 35 U.S.C. 154(b) by 253 days.

(21) Appl. No.: 13/391,613

(22) PCT Filed: Sep. 13, 2010

(86) PCT No.: PCT/KR2010/006218
§ 371 (c)(1),
(2), (4) Date: Feb. 21, 2012

(87) PCT Pub. No.: WO2011/031108
PCT Pub. Date: Mar. 17, 2011

(65) Prior Publication Data
US 2012/0170506 A1    Jul. 5, 2012

Related U.S. Application Data

(60) Provisional application No. 61/241,402, filed on Sep. 11, 2009, provisional application No. 61/242,337, filed on Sep. 14, 2009.

(30) Foreign Application Priority Data

Sep. 8, 2010    (KR) .................... 10-2010-0087883

(51) Int. Cl.
*H04B 7/14*    (2006.01)
*H04L 25/03*    (2006.01)
*H04L 5/00*    (2006.01)
*H04B 7/155*    (2006.01)
*H04L 27/26*    (2006.01)
*H04W 72/04*    (2009.01)

(52) U.S. Cl.
CPC .......... *H04B 7/155* (2013.01); *H04W 72/0446* (2013.01); *H04L 25/03343* (2013.01); *H04L 5/0042* (2013.01); *H04L 5/0023* (2013.01); *H04L 5/0092* (2013.01); *H04L 2025/03777* (2013.01); *H04L 27/2602* (2013.01)
USPC ........... 370/315; 370/310; 370/316; 370/323; 455/7; 455/11.1; 455/12.1

(58) Field of Classification Search
None
See application file for complete search history.

(56) References Cited

U.S. PATENT DOCUMENTS

| | | | |
|---|---|---|---|
| 2007/0058577 A1* | 3/2007 | Rubin | 370/328 |
| 2009/0303918 A1* | 12/2009 | Ma et al. | 370/315 |
| 2010/0136903 A1* | 6/2010 | Lee et al. | 455/17 |
| 2011/0075748 A1* | 3/2011 | Novak et al. | 375/260 |

OTHER PUBLICATIONS

IEEE, "Part 16: Air Interface for Broadband Wireless Access Systems, Amendment 1: Multihop Relay Specification", IEEE Std 802.16j, May 2009.

(Continued)

*Primary Examiner* — Anez Ebrahim
(74) *Attorney, Agent, or Firm* — Lee, Hong, Degerman, Kang & Waimey

(57) ABSTRACT

Provided are a method and an apparatus for transmitting a frame in a wireless communication system including a relay station. A base station sets a frame including a downlink (DL) access zone for transmitting a signal to the relay station and a DL relay zone for transmitting the signal to the relay station or a terminal, and transmits the frame. The DL access zone comprises a multiple-input multiple-output (MIMO) midamble for the terminal and the DL relay zone comprises an R-amble as an additional MIMO midamble.

10 Claims, 10 Drawing Sheets

(56) References Cited

OTHER PUBLICATIONS

Sydir, et al., "An Evolved Cellular System Architecture Incorporating Relay Stations", IEEE Communications Magazine, p. 115-121, Jun. 2009.

Peters, et al., "The Future of WiMAX: Multihop Relaying with IEEE 802.16j", IEEE Communications Magazine, p. 104-111, Jan. 2009.

Tao, et al., "Frame Structure Design for IEEE 802.16j Mobile Multihop Relay (MMR) Networks", Nov. 2007.

* cited by examiner

METHOD AND APPARATUS FOR TRANSMITTING FRAME IN WIRELESS COMMUNICATION SYSTEM INCLUDING RELAY STATION

CROSS-REFERENCE TO RELATED APPLICATIONS

This application is the National Stage filing under 35 U.S.C. 371 of International Application No. PCT/KR2010/006218, filed on Sep. 13, 2010, which claims the benefit of earlier filing date and right of priority to Korean Patent Application No. 10-2010-0087883, filed on Sep. 8, 2010, and also claims the benefit of U.S Provisional Application Nos. 61/242,337, filed on Sep. 14, 2009, and 61/241,402, filed on Sep. 11, 2009, the contents of which are all hereby incorporated by reference herein in their entirety.

BACKGROUND OF THE INVENTION

1. Field of the Invention

The present invention relates to wireless communications, and more particularly, to a method and apparatus for transmitting a frame in a wireless communication system including a relay station.

2. Related Art

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., 4th generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

An orthogonal frequency division multiplexing (OFDM) system capable of reducing inter-symbol interference (ISI) with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading, and an interval of a transmitted symbol is increased, thereby minimizing inter-symbol interference. When a system uses the OFDM as a modulation scheme, orthogonal frequency division multiple access (OFDMA) is a multiple access scheme in which multiple access is achieved by independently providing some of available subcarriers to a plurality of users. In the OFDMA, frequency resources (i.e., subcarriers) are provided to the respective users, and the respective frequency resources do not overlap with one another in general since they are independently provided to the plurality of users. Consequently, the frequency resources are allocated to the respective users in a mutually exclusive manner.

In an OFDMA system, frequency diversity for multiple users can be obtained by using frequency selective scheduling, and subcarriers can be allocated variously according to a permutation rule for the subcarriers. In addition, a spatial multiplexing scheme using multiple antennas can be used to increase efficiency of a spatial domain. In order to support the various schemes described above, a control signal must be transmitted between a mobile station (MS) and a base station (BS). Examples of the control signal include a channel quality indicator (CQI) for reporting a channel state from the MS to the BS, an acknowledgement/not-acknowledgement (ACK/NACK) signal in response to data transmission, a bandwidth request signal for requesting allocation of a radio resource, precoding information in a multiple antenna system, antenna information, etc. The control signal is transmitted through a control channel.

A wireless communication system including a relay station (RS) has recently been developed. The RS is employed for cell coverage extension and transmission capability improvement. A BS provides a service to an MS located in a coverage boundary of the BS via the RS, and thus can obtain an effect of extending the cell coverage. In addition, the RS improves signal transmission reliability between the BS and the MS, thereby improving transmission capacity. The RS can be used when the MS is located in a shadow area even if the MS is located within the coverage of the BS.

A midamble is a signal transmitted by the BS to allow the MS to directly measure a channel state. When the BS transmits signals by using a multiple input multiple output (MIMO) technique through a plurality of antennas, the BS can transmit different signals for the respective antennas or transmit signals at different locations in a resource region, and the MS can measure a channel state for each antenna of the BS by receiving a midamble and thus estimate a channel state of a serving cell or an interference level of a neighbor cell. The BS can adaptively schedule resources by receiving a feedback of the channel state estimated by the MS.

The wireless communication system including the RS requires a new frame structure different from the conventional frame structure. In addition, similarly to a case where the MS receives a preamble or a midamble to establish synchronization with the BS or to estimate a channel state, the RS also needs to receive a signal to establish synchronization with the BS or to estimate the channel state.

SUMMARY OF THE INVENTION

The present invention provides a method and apparatus for transmitting a frame in a wireless communication system including a relay station.

In an aspect, a method for transmitting a frame of a base station in a wireless communication system including a relay station is provided. The method includes configuring a downlink (DL) access zone for transmitting a signal to the relay station and a DL relay zone for transmitting a signal to the relay station or a mobile station, and transmitting the frame, wherein the DL access zone includes a multiple-input multiple-output (MIMO) midamble for the mobile station, and the DL relay zone includes a relay-amble (R-amble) which is an additional MIMO midamble for the relay station. The method may further include transmitting an R-amble indicator indicating whether the R-amble is included. The R-amble indicator may be transmitted to the mobile station through a secondary-superframe header (S-SFH) SP2. The R-amble indicator may be transmitted to the relay station through an ARS-CONFIG-CMD message. A transmission period of the R-amble may be at least one frame. The R-amble may be included in a DL relay zone of a first frame of each superframe. The R-amble may occupy a dedicated symbol pre-allocated in the DL relay zone.

In another aspect, a method of estimating a channel in a wireless communication system including a relay station is provided. The method includes receiving a relay-amble (R-amble) which is an additional multiple input multiple output (MIMO) midamble for the relay station in a downlink (DL) relay zone which is a radio resource region for transmitting a signal by a base station to the relay station or a mobile station, and estimating a channel state between the relay station and the base station by using the R-amble. The method may further include receiving an R-amble indicator indicating whether the R-amble is included. The R-amble indicator may be transmitted through an ARS-CONFIG-CMD message. A transmission period of the R-amble may be at least one frame. The R-amble may be included in a DL relay zone of a first frame of each superframe. The R-amble may occupy a dedicated symbol pre-allocated in the DL relay zone.

In another aspect, an apparatus for transmitting a frame in a wireless communication system is provided. The apparatus includes a radio frequency (RF) unit for transmitting or receiving a radio signal, and a processor coupled to the RF unit, wherein the processor is configured for configuring a downlink (DL) access zone for transmitting a signal to a relay station and a DL relay zone for transmitting a signal to the relay station or a mobile station, and transmitting the frame, wherein the DL access zone includes a multiple-input multiple-output (MIMO) midamble for the mobile station, and the DL relay zone includes an R-amble which is an additional MIMO midamble for the relay station.

According to the present invention, a wireless communication system including a relay station can transmit a frame by considering an R-amble, that is, a midamble for the relay station.

DESCRIPTION OF EXEMPLARY EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11(Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a universal mobile telecommunications system (UMTS). 3rd generation partnership project (3GPP) long term evolution (LTE) is part of evolved UMTS (E-UMTS) using evolved-UMTS terrestrial radio access (E-UTRA), and it adopts OFDMA in downlink (DL) and SC-FDMA in uplink (UL). LTE-A (advanced) is the evolution of 3GPP LTE.

IEEE 802.16m is chiefly described as an example in order to clarify the description, but the technical spirit of the present invention is not limited to IEEE 802.16m.

Figure 1:
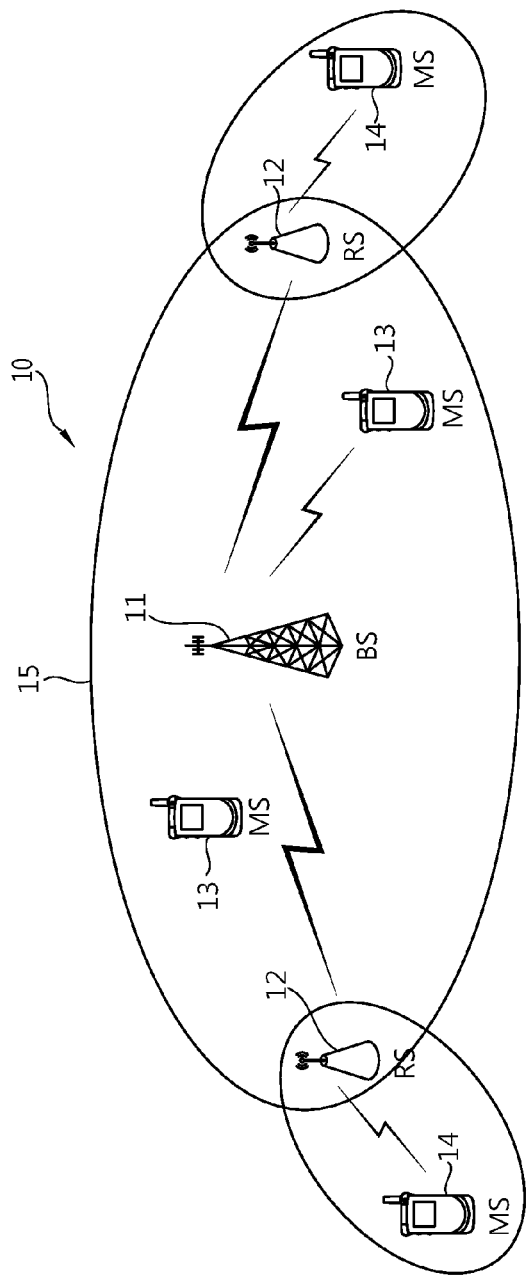
FIG. 1 shows a wireless communication system including a relay station.

FIG. 1 shows a wireless communication system including a relay station.

Referring to FIG. 1, a wireless communication system 10 including a relay station (RS) 12 includes at least one base station (BS) 11. Each BS 11 provides a communication service to a specific geographical region 15 generally referred to as a cell. The cell can be divided into a plurality of regions, and each region can be referred to as a sector. One or more cells may exist in the coverage of one BS. The BS 11 is generally a fixed station that communicates with a mobile station (MS) 13 and may be referred to as another terminology, such as an evolved node-B (eNB), a base transceiver system (BTS), an access point, an access network (AN), an advanced BS (ABS), etc. The BS 11 can perform functions such as connectivity between the RS 12 and an MS 14, management, control, resource allocation, etc.

The RS 12 is a device for relaying a signal between the BS 11 and the MS 14, and is also referred to as another terminology such as a relay node (RN), a repeater, an advanced RS (ARS), etc. A relay scheme used in the RS may be either amplify and forward (AF) or decode and forward (DF), and the technical features of the present invention are not limited thereto.

The MSs 13 and 14 may be fixed or mobile, and may be referred to as another terminology, such as a an advanced mobile station (AMS), a user terminal (UT), a subscriber station (SS), a wireless device, a personal digital assistant (PDA), a wireless modem, a handheld device, an access terminal (AT), a user equipment (UE), etc. Hereinafter, a macro MS denotes an MS that directly communicates with the BS 11, and a relay MS denotes an MS that communicates with the RS. To improve a data transfer rate depending on a diversity effect, a macro MS 13 located in the cell of the BS 11 can also communicate with the BS 11 via the RS 12.

Between the BS and the macro MS, a downlink (DL) denotes communication from the BS to the macro MS, and an uplink (UL) denotes communication from the macro MS to the BS. Between the BS and the RS, a DL denotes communication from the BS to the RS, and a UL denotes communication from the RS to the BS. Between the RS and the relay MS, a DL denotes communication from the RS to the relay MS, and a UL denotes communication from the relay MS to the RS.

Figure 2:
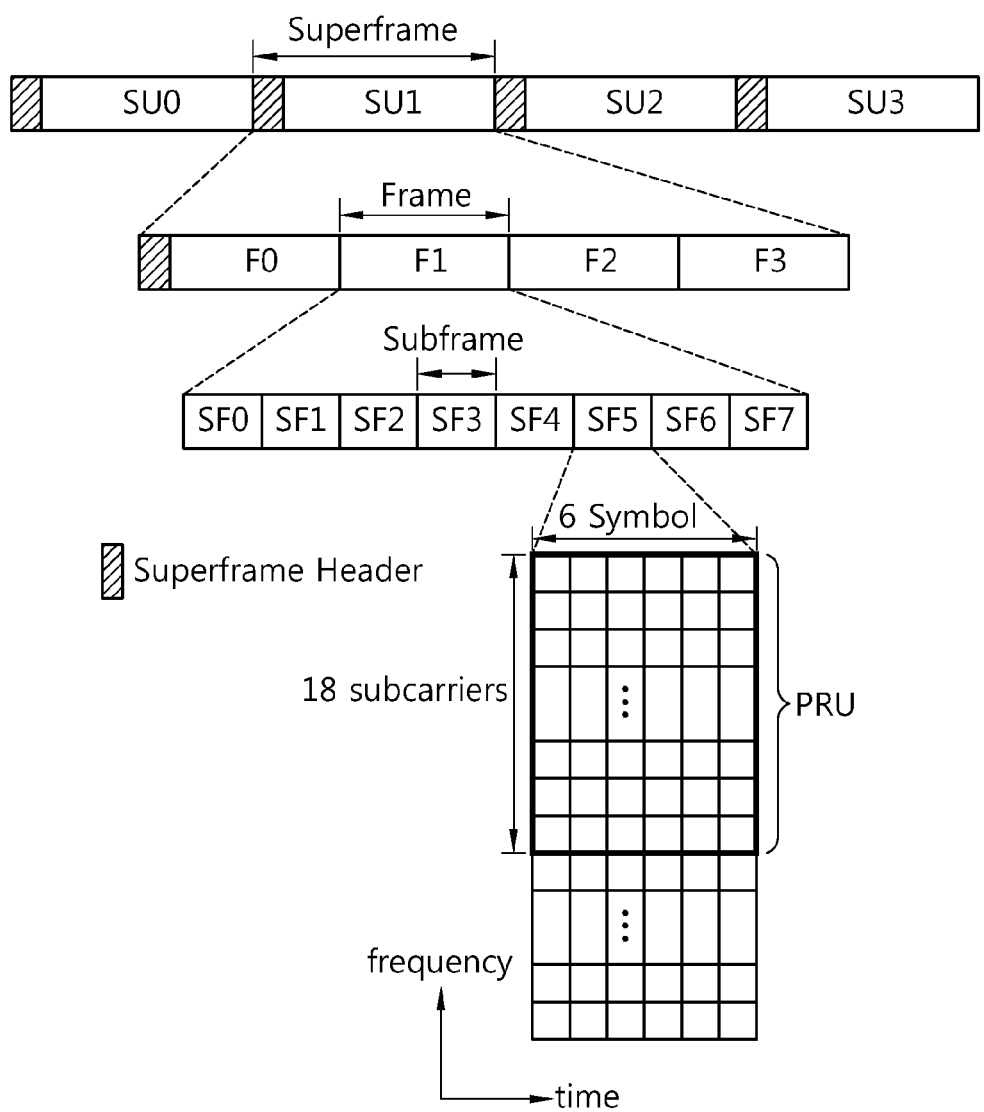
FIG. 2 shows an example of a frame structure.

FIG. 2 shows an example of a frame structure.

Referring to FIG. 2, a superframe (SF) includes a superframe header (SFH) and four frames F0, F1, F2, and F3. Each frame may have the same length in the SF. Although it is shown that each SF has a length of 20 milliseconds (ms) and each frame has a length of 5 ms, the present invention is not limited thereto. A length of the SF, the number of frames included in the SF, the number of SFs included in the frame, or the like can change variously. The number of SFs included in the frame may change variously according to a channel bandwidth and a cyclic prefix (CP) length.

One frame includes 8 subframes SF0, SF1, SF2, SF3, SF4, SF5, SF6, and SF7. Each subframe can be used for uplink or downlink transmission. One subframe includes a plurality of orthogonal frequency division multiplexing (OFDM) symbols in a time domain, and includes a plurality of subcarriers in a frequency domain. An OFDM symbol is for representing one symbol period, and can be referred to as other terminologies such as an OFDM symbol, an SC-FDMA symbol, etc., according to a multiple access scheme. The subframe can consist of 5, 6, 7, or 9 OFDMA symbols. However, this is for exemplary purposes only, and thus the number of OFDMA symbols included in the subframe is not limited thereto. The number of OFDMA symbols included in the subframe may change variously according to a channel bandwidth and a CP length. A subframe type may be defined according to the number of OFDMA symbols included in the subframe. For example, it can be defined such that a type-1 subframe includes 6 OFDMA symbols, a type-2 subframe includes 7 OFDMA symbols, a type-3 subframe includes 5 OFDMA symbols, and a type-4 subframe includes 9 OFDMA symbols. One frame may include subframes each having the same type. Alternatively, one frame may include subframes each having a different type. That is, the number of OFDMA symbols included in each subframe may be identical or different in one frame. Alternatively, the number of OFDMA symbols included in at least one subframe of one frame may be different from the number of OFDMA symbols of the remaining subframes of the frame.

Time division duplex (TDD) or frequency division duplex (FDD) may be applied to the frame. In the TDD, each subframe is used in uplink or downlink transmission at the same frequency and at a different time. That is, subframes included in a TDD frame are divided into an uplink subframe and a downlink subframe in the time domain. A switching point refers to a point where a transmission direction is changed from an uplink region to a downlink region or from a downlink region to an uplink region. In the TDD, the number of the switching points in each frame may be two. In the FDD, each subframe is used in uplink or downlink transmission at the same time and at a different frequency. That is, subframes included in an FDD frame are divided into an uplink subframe and a downlink subframe in the frequency domain. Uplink transmission and downlink transmission occupy different frequency bands and can be simultaneously performed.

A superframe header (SFH) may carry an essential system parameter and system configuration information. The SFH may be located in a first subframe of a superframe. The SFH may occupy last 5 OFDMA symbols of the first subframe. The SFH can be classified into a primary-SFH (P-SFH) and a secondary-SFH (S-SFH). The P-SFH and the S-SFH may be transmitted in every superframe. The S-SFH may be transmitted in two consecutive superframes. Information transmitted on the S-SFH may be classified into three sub-packets, i.e., an S-SFH SP1, an S-SFH SP2, and an S-SFH SP3. Each sub-packet can be transmitted periodically with a different period. Information transmitted in the S-SFH SP1, the S-SFH SP2, and the S-SFH SP3 may have different importance from one another. The S-SFH SP1 may be transmitted with a shortest period, and the S-SFH SP3 may be transmitted with a longest period. The S-SFH SP1 includes information on network re-entry. The S-SFH SP2 includes information on initial network entry and network discovery. The S-SFH SP3 includes other important system information.

One OFDMA symbol includes a plurality of subcarriers. The number of subcarriers is determined by a fast Fourier transform (FFT) size. The subcarrier can be classified into a data subcarrier for data transmission, a pilot subcarrier for various estimations, and a null subcarrier for a guard band and a direct current (DC) carrier. The OFDMA symbol is characterized by parameters BW, $N_{used}$, n, G, etc. The parameter BW denotes a nominal channel bandwidth. The parameter $N_{used}$ denotes the number of used subcarriers (including the DC subcarrier). The parameter n denotes a sampling factor. The parameter n is combined with the parameters BW and $N_{used}$ to determine a subcarrier spacing and a useful symbol time. The parameter G denotes a ratio of a cyclic prefix (CP) time and a useful time.

Table 1 below shows an orthogonal frequency division multiple access (OFDMA) parameter.

TABLE 1

| | | | | | | |
|---|---|---|---|---|---|---|
| Channel bandwidth, BW(MHz) | | 5 | 7 | 8.75 | 10 | 20 |
| Sampling factor, n | | 28/25 | 8/7 | 8/7 | 28/25 | 28/25 |
| Sampling frequency, Fs(MHz) | | 5.6 | 8 | 10 | 11.2 | 22.4 |
| FFT size, $N_{FFT}$ | | 512 | 1024 | 1024 | 1024 | 2048 |
| Subcarrier spacing, $\Delta f$(kHz) | | 10.94 | 7.81 | 9.77 | 10.94 | 10.94 |
| Useful symbol time Tb(μs) | | 91.4 | 128 | 102.4 | 91.4 | 91.4 |
| G = 1/8 | Symbol time, Ts(μs) | 102.857 | 144 | 115.2 | 102.857 | 102.857 |
| | FDD Number of OFDMA symbols per 5 ms frame | 48 | 34 | 43 | 48 | 48 |
| | Idle time(μs) | 62.857 | 104 | 46.40 | 62.857 | 62.857 |
| | TDD Number of OFDMA symbols per 5 ms frame | 47 | 33 | 42 | 47 | 47 |
| | TTG + RTG(μs) | 165.714 | 248 | 161.6 | 165.714 | 165.714 |
| G = 1/16 | Symbol time, Ts(μs) | 97.143 | 136 | 108.8 | 97.143 | 97.143 |
| | FDD Number of OFDMA symbols per 5 ms frame | 51 | 36 | 45 | 51 | 51 |
| | Idle time(μs) | 45.71 | 104 | 104 | 45.71 | 45.71 |
| | TDD Number of OFDMA symbols per 5 ms frame | 50 | 35 | 44 | 50 | 50 |
| | TTG + RTG(μs) | 142.853 | 240 | 212.8 | 142.853 | 142.853 |

TABLE 1-continued

| | | | | | | | |
|---|---|---|---|---|---|---|---|
| G = 1/4 | | Symbol time, Ts(μs) | 114.286 | 160 | 128 | 114.286 | 114.286 |
| | FDD | Number of OFDMA symbols per 5 ms frame | 43 | 31 | 39 | 43 | 43 |
| | | Idle time(μs) | 85.694 | 40 | 8 | 85.694 | 85.694 |
| | TDD | Number of OFDMA symbols per 5 ms frame | 42 | 30 | 38 | 42 | 42 |
| | | TTG + RTG(μs) | 199.98 | 200 | 136 | 199.98 | 199.98 |
| Number of Guard subcarriers | | Left | 40 | 80 | 80 | 80 | 160 |
| | | Right | 39 | 79 | 79 | 79 | 159 |
| Number of used subcarriers | | | 433 | 865 | 865 | 865 | 1729 |
| Number of PRU in type-1 subframe | | | 24 | 48 | 48 | 48 | 96 |

In Table 1, $N_{FFT}$ denotes a smallest power of 2 greater than $N_{used}$. A sampling factor is defined as $F_s$=floor(n·BW/8000)× 8000. A subcarrier spacing is defined as $\Delta f=Fs/N_{FFT}$. A useful symbol time is defined as Tb=1/$\Delta f$. A CP time is defined as Tg=G·Tb. An OFDMA symbol time is defined as Ts=Tb+Tg. A sampling time is defined as Tb/$N_{FFT}$.

Figure 3:
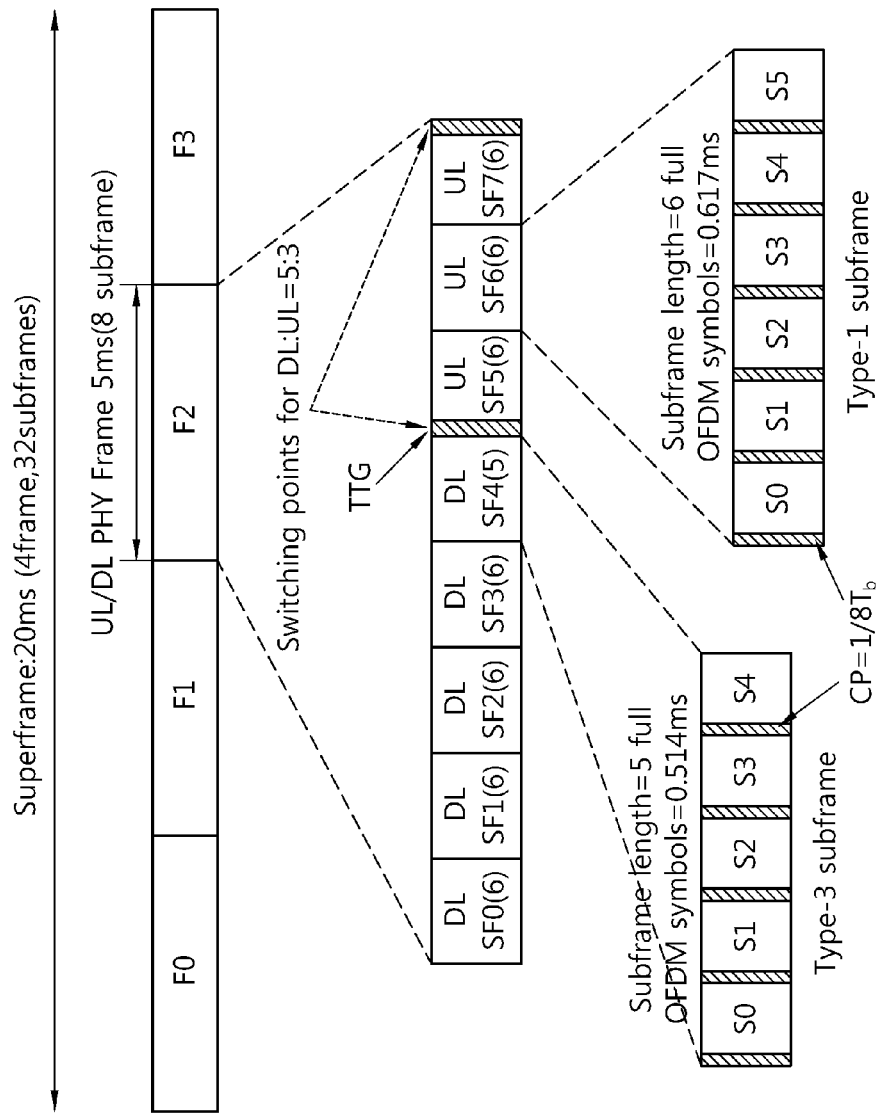
FIG. 3 shows an example of a TDD frame structure.

FIG. 3 shows an example of a TDD frame structure. In this structure, G=1/8. A superframe having a length of 20 ms consists of 4 frames F0, F1, F2, and F3 each having a length of 5 ms. One frame consists of 8 subframes SF0, SF1, SF2, SF3, SF4, SF5, SF6, and SF7, and a ratio of a DL subframe to a UL subframe is 5:3. The TDD frame structure of FIG. 3 can be used when a bandwidth is 5 MHz, 10 MHz, or 20 MHz. The last DL subframe SF4 includes 5 OFDM symbols, and the remaining subframes include 6 subframes.

Figure 4:
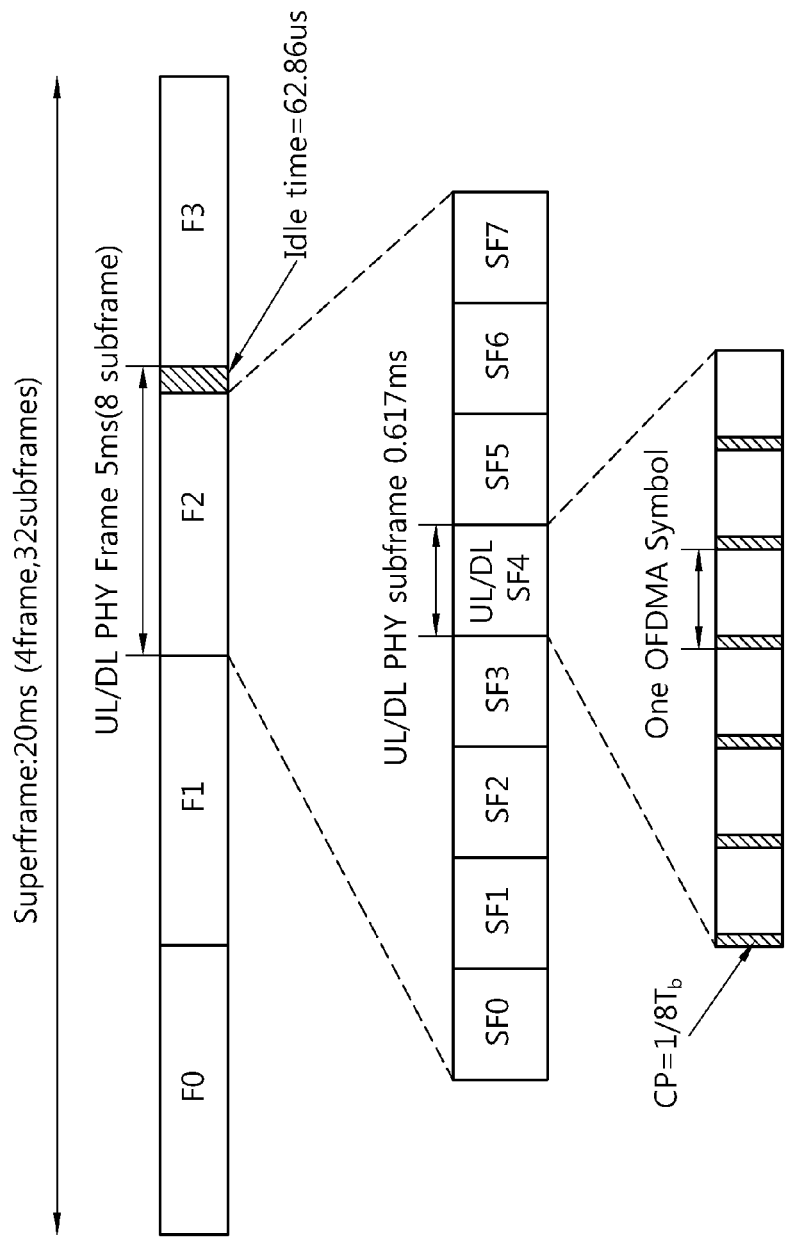
FIG. 4 shows an example of an FDD frame structure.

FIG. 4 shows an example of an FDD frame structure. In this structure, G=1/8. A superframe having a length of 20 ms consists of 4 frames F0, F1, F2, and F3 each having a length of 5 ms. One frame consists of 8 subframes SF0, SF1, SF2, SF3, SF4, SF5, SF6, and SF7, and all subframes include a DL region and a UL region. The FDD frame structure of FIG. 4 can be used when a bandwidth is 5 MHz, 10 MHz, or 20 MHz.

The aforementioned frame structures can apply between a BS and a macro MS. However, when a wireless communication system includes an RS, it is difficult to apply to the RS the same frame structure applied between the BS and the macro MS. The RS requires a radio resource region for DL transmission with respect to a relay MS connected to the RS. Further, since the RS receives a signal from the relay MS and thereafter decodes and transmits it to the BS, the RS requires a radio resource region for UL transmission. The RS can transmit a signal to an MS connected to the RS or can receive a signal from the BS in the same frequency band. Further, the RS can receive a signal from the MS connected to the RS or can transmit a signal to the BS in the same frequency band. Therefore, the RS requires a transition gap when switching a transmission/reception operation of a signal. In general, it is assumed that the RS cannot transmit or receive a signal in the transition gap.

As a preamble, the RS can use a unique sequence different from that used in the BS. In this case, by analyzing a sequence received through the preamble, the MS can know whether the MS receives a service provided by the BS or the RS. This is referred to as awareness. Since the MS can be aware of whether the MS receives the service provided by the RS, the RS can use a frame structure different from that used in the BS. A frame structure for the RS may include a subframe including a transition gap. In communication between the RS and the MS, the MS may perform transmission and reception of signals according to a frame structure different from a frame structure used for communication with the BS. If the MS is not aware of whether the MS receives the service provided by the BS or the RS, the frame structure and the transition gap have to be determined so that the MS can use a service of the RS without any difference from the BS. In this case, the frame structure between the RS and the BS may be different from the frame structure between the MS and the BS. The RS receives frame configuration information regarding an RS frame from the BS, and configures the RS frame according to the frame configuration information. In the RS frame, the frame configuration information may include information indicating a radio resource region for communication with the relay MS and a radio resource region for communication with the BS. The BS can transmit the frame configuration information by including it in DL control information. For example, the frame configuration information can be transmitted by being included in a superframe header (SFH). In this case, the frame configuration information can apply to a plurality of frames. The RS frame configured according to the frame configuration information will be described below in detail. The RS transmits or receives a signal to the MS connected to the RS or to the BS according to the configured RS frame structure.

Figure 5:
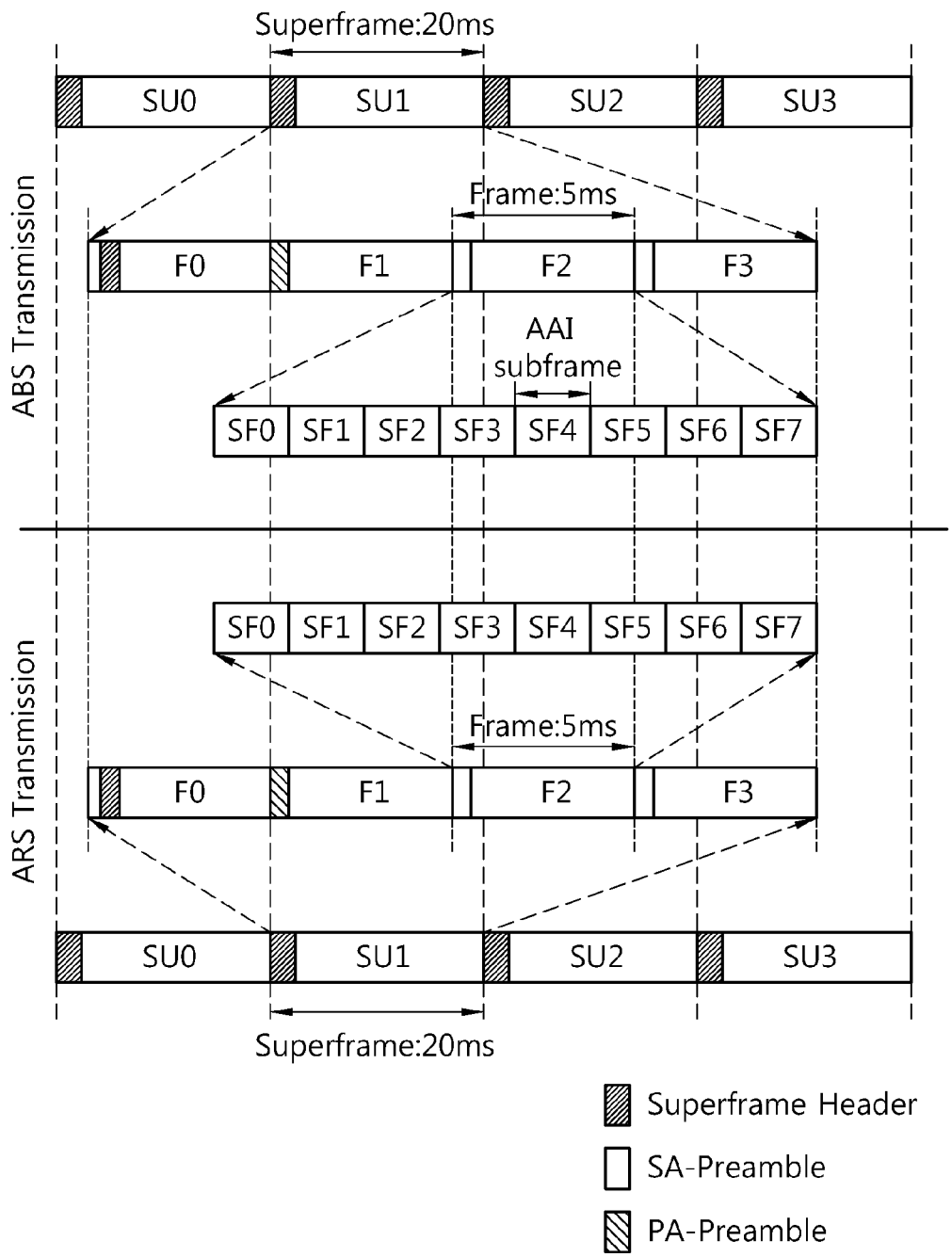
FIG. 5 shows an example of a frame structure of a system including an RS.

FIG. 5 shows an example of a frame structure of a system including an RS.

OFDMA parameters of Table 1 can be directly used in the system including the RS. Superframes of a BS and an MS can be time aligned, and include the same number of frames and subframes. Each RS superframe includes an SFH. An SFH transmitted by the RS has the same location and the same format as an SFH transmitted by the BS. An RS preamble (i.e., SA-preamble and PA-preamble) and a super-ordinate BS preamble are transmitted simultaneously.

The RS conforms to a frame structure of a basic IEEE 802.16m system. In a simultaneous transmit receive (STR) relay, a BS-RS frame structure and an RS-MS frame structure are the same as a BS-MS frame structure. In a time-division transmit and receive (TTR) relay, a BS-RS frame and a MS frame are transmitted by using time division multiplexing. Hereinafter, the TTR relay will be described.

In the system supporting the RS, the BS frame is divided into an access zone and a relay zone. In the frame, the access zone can be located ahead of the relay zone. Alternatively, in the FDD system, the relay zone can be located ahead of the access zone in a UL frame. A duration of the access zone and the relay zone is different between DL and UL. The access zone and the relay zone can be configured by using an AAI_ARS-CONFIG-CMD message transmitted by the BS.

In a BS frame, an access zone consists of a DL access zone and a UL access zone, and a relay zone consists of a DL relay zone and a UL relay zone. The BS frame access zone is used to communicate with only the MS. The BS frame relay zone can be used to communicate with the RS, and can be used to communicate with the MS. In the DL relay zone, the BS transmits a signal to a sub-ordinate RS. In the UL relay zone, the BS receives a signal from the sub-ordinate RS.

In an RS frame, an access zone consists of a DL access zone and a UL access zone, and a relay zone consists of a DL relay zone and a UL relay zone. The RS frame access zone is used to communicate with only the MS. In the DL relay zone, the RS receives a signal from a super-ordinate BS. In the UL relay zone, the RS transmits a signal to the super-ordinate BS.

When the RS or the MS receives a frame configuration index through an S-SFH SP1, DL/UL access and relay zones are configured in a frame.

A transmit/receive transition gap (TTG) is located between a DL region and a UL region. A receive/transmit transition gap (RTG) is located between the UL region and a subsequent frame. In order to avoid inter-symbol interference, an idle time may be included in the TTG or the RTG according to a CP size.

state and a level of interference from a neighbor cell. The BS may receive a feedback of the channel state measured by the MS to adaptively schedule a resource. In case of closed-loop MIMO, the midamble may be used to select a precoding matrix indicator (PMI). In case of open-loop MIMO, the midamble may be used to measure a channel quality indicator (CQI). Further, the midamble may be transmitted in a $2^{nd}$ DL subframe of each frame. The midamble may occupy one OFDM symbol in the $2^{nd}$ DL subframe. When a subframe consists of 6 OFDM symbols (type-1 subframe), the remaining 5 OFDM symbols may constitute a subframe (type-3 subframe). Further, when a subframe consists of 7 OFDM symbols (type-2 subframe), the remaining 6 OFDM symbols may constitute a subframe (type-1 subframe).

The midamble is transmitted in a sequence format. Various types of sequence may be used as a midamble sequence. In particular, a Golay sequence may be used as the midamble sequence. Table 2 below shows an example of a Golay sequence with a length of 2048 bits.

TABLE 2

| | | | | | | | | | | | |
|---|---|---|---|---|---|---|---|---|---|---|---|
| 0xEDE2 | 0xED1D | 0xEDE2 | 0x12E2 | 0xEDE2 | 0xED1D | 0x121D | 0xED1D | 0xEDE2 | 0xED1D | 0xEDE2 | 0x12E2 |
| 0x121D | 0x12E2 | 0xEDE2 | 0x12E2 | 0xEDE2 | 0xED1D | 0xEDE2 | 0x12E2 | 0xEDE2 | 0xED1D | 0x121D | 0xED1D |
| 0x121D | 0x12E2 | 0x121D | 0xED1D | 0xEDE2 | 0xED1D | 0x121D | 0xED1D | 0xEDE2 | 0xED1D | 0xEDE2 | 0x12E2 |
| 0xEDE2 | 0xED1D | 0x121D | 0xED1D | 0xEDE2 | 0xED1D | 0xEDE2 | 0x12E2 | 0x121D | 0x12E2 | 0xEDE2 | 0x12E2 |
| 0x121D | 0x12E2 | 0x121D | 0xED1D | 0x121D | 0x12E2 | 0xEDE2 | 0x12E2 | 0xEDE2 | 0xED1D | 0xEDE2 | 0x12E2 |
| 0x121D | 0x12E2 | 0xEDE2 | 0x12E2 | 0xEDE2 | 0xED1D | 0x12E2 | 0x12E2 | 0xEDE2 | 0xED1D | 0x121D | 0xED1D |
| 0xEDE2 | 0xED1D | 0xEDE2 | 0x12E2 | 0x121D | 0x12E2 | 0xEDE2 | 0x12E2 | 0xEDE2 | 0xED1D | 0xEDE2 | 0x12E2 |
| 0xEDE2 | 0xED1D | 0x121D | 0xED1D | 0x121D | 0x12E2 | 0x121D | 0xED1D | 0xEDE2 | 0xED1D | 0x121D | 0xED1D |
| 0x121D | 0x12E2 | 0x121D | 0xED1D | 0x121D | 0x12E2 | 0xEDE2 | 0x12E2 | 0x121D | 0x12E2 | 0x121D | 0xED1D |
| 0xEDE2 | 0xED1D | 0x121D | 0xED1D | 0xEDE2 | 0xED1D | 0xEDE2 | 0x12E2 | 0xEDE2 | 0xED1D | 0x121D | 0xED1D |
| 0x121D | 0x12E2 | 0x121D | 0xED1D | 0xEDE2 | 0xED1D | 0x121D | 0xED1D | | | | |

The transition gap may be a relay transmit to receive transition interval (R-TTI) or a relay receive to transmit transition interval (R-RTI). The R-TTI is a time that can be inserted while switching is performed from an operation of transmitting a signal by the RS to the relay MS to an operation of receiving signal from the BS. The R-TTI may be one symbol. The R-RTI is a time that can be inserted while switching is performed from an operation of receiving a signal by the RS from the relay MS to an operation of transmitting a signal to the BS. The R-RTI may be one symbol. The R-TTI may be determined such that a round trip delay (RTD) and an ARS transmit/receive transition gap (ARSTTG) between the RS and a super-ordinate station of the RS can be sorted. The R-RTI may be determined such that an RTD and an ARS receive/transmit transition gap (ARSRTG) between the RS and the super-ordinate station of the RS can be sorted.

Meanwhile, an MS that receives a service not by an RS but by a BS can transmit and receive data according to a frame structure of the BS irrespective of a conventional frame structure of the RS.

A midamble is a signal transmitted by the BS to allow the MS to directly measure a channel state. When the BS transmits signals by using a multiple input multiple output (MIMO) technique through a plurality of antennas, the BS can transmit different signals for the respective antennas or transmit signals at different locations in a resource region, and the MS can measure a channel state for each antenna of the BS by receiving a midamble and thus estimate a channel state of a serving cell or an interference level of a neighbor cell. The BS can adaptively schedule resources by receiving a feedback of the channel state estimated by the MS.

A channel state may be measured for each antenna by using a MIMO midamble (hereinafter, a midamble). The MS may receive the midamble from each antenna to measure a channel A midamble signal s(t) transmitted through each antenna can be determined by Equation 1 below.

$$s(t) = Re\left\{ e^{j2\pi f_c t} \sum_{\substack{k=0 \\ k \neq \frac{N_{used}-1}{2}}}^{k=N_{used}-1} b_k \cdot e^{j2\pi\left(k - \frac{N_{used}-1}{2}\right)\Delta f(t-T_g)} \right\}$$ [Equation 1]

k denotes a subcarrier index, $N_{used}$ denotes the number of subcarriers to which the midamble sequence is mapped, $f_c$ denotes a carrier frequency, $\Delta f$ denotes a subcarrier spacing, and Tg denotes a guard time. $b_k$ denotes a complex coefficient for modulating subcarriers in an OFDM symbol to which the midamble is mapped.

Meanwhile, the BS can transmit an additional MIMO midamble in the AAI DL relay zone (hereinafter, an R-amble) in addition to the midamble. The R-amble can be transmitted through a first frame of a DL relay zone of each superframe.

In a TDD mode, R-amble transmission can be performed through a last OFDMA symbol of a subframe of a first DL relay zone which is not a type 3 when it is calculated from an end of a DL frame.

In an FDD mode, R-amble transmission can be performed through a last OFDMA symbol of a second subframe from an end of a DL relay zone. If the second subframe from the end of the DL relay zone is a type-3 subframe, the R-amble can be transmitted in a last OFDMA symbol of a type-1 or type-2 subframe of a nearest previous DL relay zone.

A subframe of a DL relay zone of BS and RS frames in which the R-amble is located is transmitted in a subframe type in which the number of symbols is decreased by one. In case of the type-1 subframe, the remaining 5 consecutive symbols constitute a type-3 subframe. In case of the type-2 subframe, the remaining 6 consecutive symbols constitute a type-1 subframe.

The aforementioned RS frame configuration or R-amble configuration can be performed by using an ARS-CONFIG-CMD message among media access control (MAC) control messages. The BS configures an operational parameter of a physical layer of an RS by using the ARS-CONFIG-CMD message. Table 3 shows an example of the ARS-CONFIG-CMD message.

TABLE 3

| Attributes | Size (bits) | Value/Note |
| --- | --- | --- |
| 16 m_DL_Relay_zone_duration | 3 | The duration of the 16 m DL Relay zone in units of subframes. |
| 16 m_UL_relay-zone_duration | 3 | The duration of the 16 m UL Relay zone in units of subframes. |
| 16 m_Relay_zone_AMS_allocation_indicator | 1 | The indicator which signalizes if the ABS may allocated resources to the AMS in the 16 m Relay zone and 16 m UL Relay zone. |
| MIMO Midamble indication in DL relay zone | 1 | 0b0: MIMO midamble is not transmitted in DL Relay zone 0b1: MIMO midamble is transmitted in DL Relay zone |

In Table 3, the 16 m_DL_relay_zone_duration field indicates an allocation duration of a DL relay zone in a superframe unit, and the 16 m_UL_Relay_zone_duration field indicates an allocation duration of a UL relay zone in a superframe unit. The 16 m_Relay_zone_AMS_allocation_indicator field may be an indicator indicating whether the BS allocates a resource to the MS in the DL relay zone and the UL relay zone. The MIMO midamble indication in AAI DL Relay zone field indicates whether an R-amble is transmitted in the DL relay zone.

Meanwhile, in the wireless communication system including the RS, cell-specific resource mapping can be performed. By the cell-specific resource mapping, the BS can perform DL transmission to the MS by using a radio resource allocated to the relay zone.

First, cell-specific resource mapping of a DL physical structure can be performed in a DL relay zone of BS and RS frames. If a Relay_zone_AMS_allocation_indicator field in a system configuration description (SCD) message and an ARS-CONFIG-CMD message is 1, the BS can perform DL transmission to the MS by using a radio resource allocated to the relay zone. On the other hand, if the Relay_zone_AMS_allocation_indicator field in the SCD message and the ARS-CONFIG-CMD message is 0, it indicates that the BS does not allocate transmission of the MS in the relay zone.

Likewise, cell-specific resource mapping of a UL physical layer can be performed in a UL relay zone of BS and RS frames. If the Relay_zone_AMS_allocation_indicator field in the SCD message and the ARS-CONFIG-CMD message is 1, it indicates that the BS allocates transmission of the MS in the relay zone. On the other hand, if the Relay_zone_AMS_allocation_indicator field in the SCD message and the ARS-CONFIG-CMD message is 0, it indicates that the BS does not allocate transmission of the MS in the relay zone.

Hereinafter, a frame transmission method according to the present invention will be described.

Figure 6:
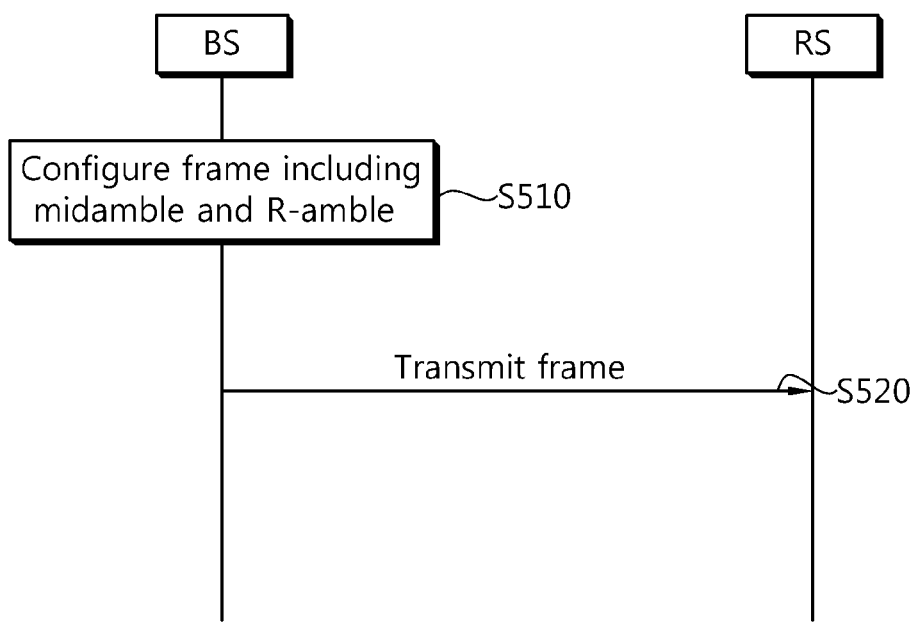
FIG. 6 is a flowchart showing a frame transmission method of a BS according to the present invention.

FIG. 6 is a flowchart showing a frame transmission method of a BS according to the present invention.

The BS transmits a frame including a DL access zone for transmitting a signal to an RS or an MS and a DL relay zone for transmitting a signal to the RS (step S510). The BS transmits the frame (step S520). In this case, the frame of the BS includes a midamble of the BS in the DL access zone, and further includes an R-amble which is an additional MIMO midamble for the RS in the DL relay zone.

In this case, the midamble of the BS can be transmitted by being included in the DL access zone or the DL relay zone. A case where the midamble is included in the DL access zone and a case where the midamble is included in the DL relay zone will be described hereinafter.

1) When a Midamble of a Bs Exist in a DL Access Zone of an RS

If the midamble of the BS exists in the DL access zone of the RS, the midamble of the BS cannot be read since it is a duration in which the RS transmits a signal. This problem can be solved by using the following two methods.

First, the BS can transmit a frame by further including an additional midamble for the RS (i.e., R-amble). Basically, the R-amble has the same structure as the midamble.

Figure 7:
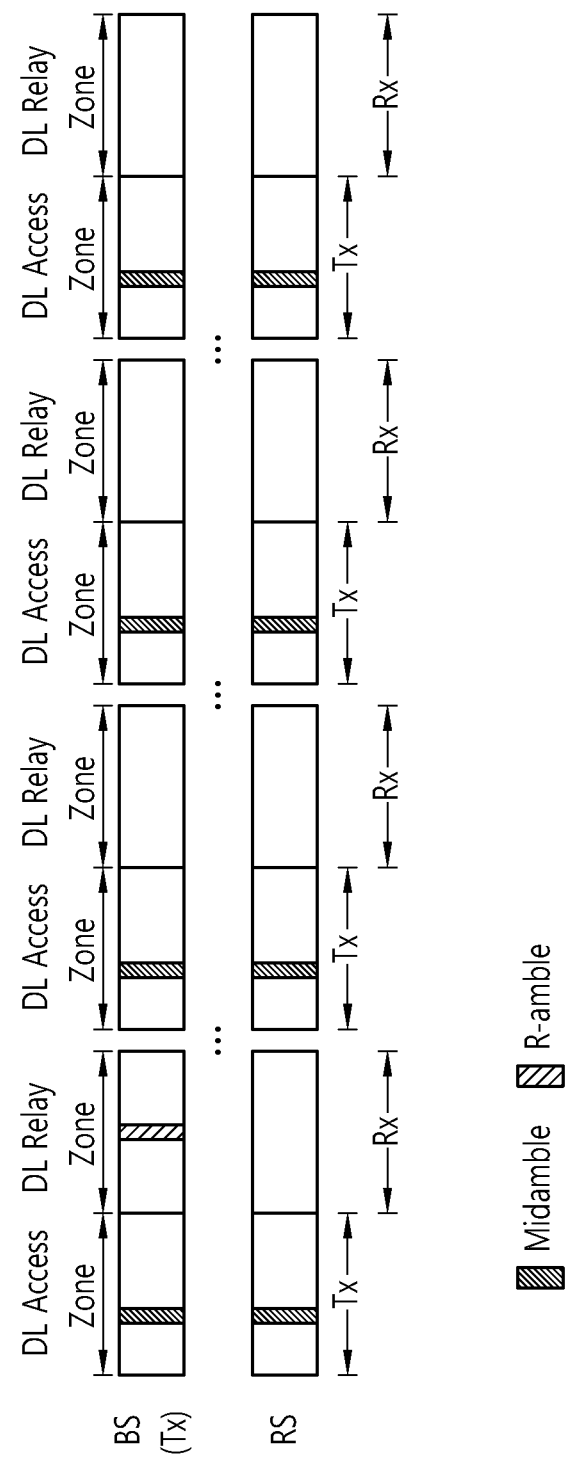
FIG. 7 shows an example of R-amble transmission according to the proposed invention.

FIG. 7 shows an example of R-amble transmission according to the proposed invention. This is a case where, when a midamble of a BS exists in a DL access zone of an RS, an R-amble is transmitted one time per subframe. According to FIG. 7, the BS can transmit the R-amble in a DL relay zone of a first frame of each superframe. In this case, the R-amble is located in the first frame for an exemplary purposes only, and thus can be located in any frame. Although not shown in FIG. 7, a transition gap exists between Tx and Rx or between Rx and Tx.

In general, a channel between the BS and the RS has a relatively less change than a channel between the BS and the MS and is in a stable state since the RS does almost not move. Therefore, it is not necessary to transmit the R-amble in every frame to recognize a channel state, and it can be transmitted only one time for several superframes. An R-amble transmitted by the BS to the RS is transmitted by using a relay zone, and can be transmitted with a long term period. For example, the R-amble can be transmitted in every frame, i.e., an interval of (5 ms), 10 ms, 15 ms, or 20 ms.

Meanwhile, a dedicated symbol for transmitting the R-amble can be separately allocated. In this case, the dedicated symbol may be an empty symbol obtained by puncturing data or by changing a subframe type. On the other hand, if the dedicated symbol of transmitting the R-amble is not separately allocated, the R-amble can be transmitted by overlapping with a symbol on which data is transmitted. In this case, the R-amble can be transmitted primarily in an empty region by avoiding a pilot.

The BS has to use a resource of a DL relay zone to transmit the R-amble. When cell-specific resource mapping is not applied, the MS has a relay awareness problem in regards to whether the R-amble exists. When the cell-specific resource mapping is not applied, data may be transmitted to a macro MS through a relay zone, and the MS may receive or may not receive the R-amble according to whether the R-amble of the BS is allocated. That is, when the MS is connected to a BS which is not connected to an RS or a BS which is connected to the RS but does not allocate the R-amble, the MS does not receive the R-amble, and when the MS is connected to a BS which is connected to an RS and which allocates the R-amble, the MS receives the R-amble. Since a frame structure changes depending on whether the R-amble is allocated, the MS needs to know whether the R-amble exists. For this, control information for indicating whether the R-amble exists can be transmitted. In this case, the control information may be a 1-bit indicator, and will be described hereinafter as an R-amble indicator. An R-amble indicator for the MS may be included in an S-SFH SP2. An R-amble indicator for the RS may be included in an ARS-CONFIG-CMD message.

When the R-amble indicator is transmitted to the MS through the S-SFH SP2, the R-amble indicator in the S-SFH SP2 may have a value '0b1' when the R-amble is transmitted in the DL relay zone and may have a value '0b0' when the R-amble is not transmitted. When the R-amble indicator is transmitted to the RS through the ARS-CONFIG-CMD message, the ARS-CONFIG-CMD message may also include a 1-bit R-amble indicator, and may have the value '0b0' when the R-amble is not transmitted and may have the value '0b1' when the R-amble is transmitted. As such, information on a location and a transmission period of the R-amble can be known through the control information when the R-amble exists. However, if such information is known in advance to the RS, there is no need to transmit the control information.

Second, the RS may not transmit a midamble of the RS in a DL access zone but receives a midamble of the BS.

In order not to have an effect on a frame structure or an operation of the BS, the RS reads a midamble with a long term period in the DL access zone. For example, if the midamble of the BS is transmitted in every frame, the RS does not transmit the midamble of the RS one time for each of several superframes, and receives the midamble of the BS.

However, a transition time for mode switching from a transmission mode to a reception mode is required, and the RS cannot transmit its signal during the transition time. That is, transmission cannot be performed during at least one symbol at both ends, including a midamble, that is, during three symbols. In this case, if the midamble is located in a first or last symbol of a subframe, transmission cannot be performed during two subframes. Alternatively, if the midamble exists in one subframe including a transition time at both sides, transmission cannot be performed during one subframe. In this case, since a hybrid automatic repeat request (HARQ) timing problem may occur in subframes in which transmission cannot be performed, non-acknowledgement (NACK) processing is required in all of those subframes, or different timing needs to be defined.

Figure 8:
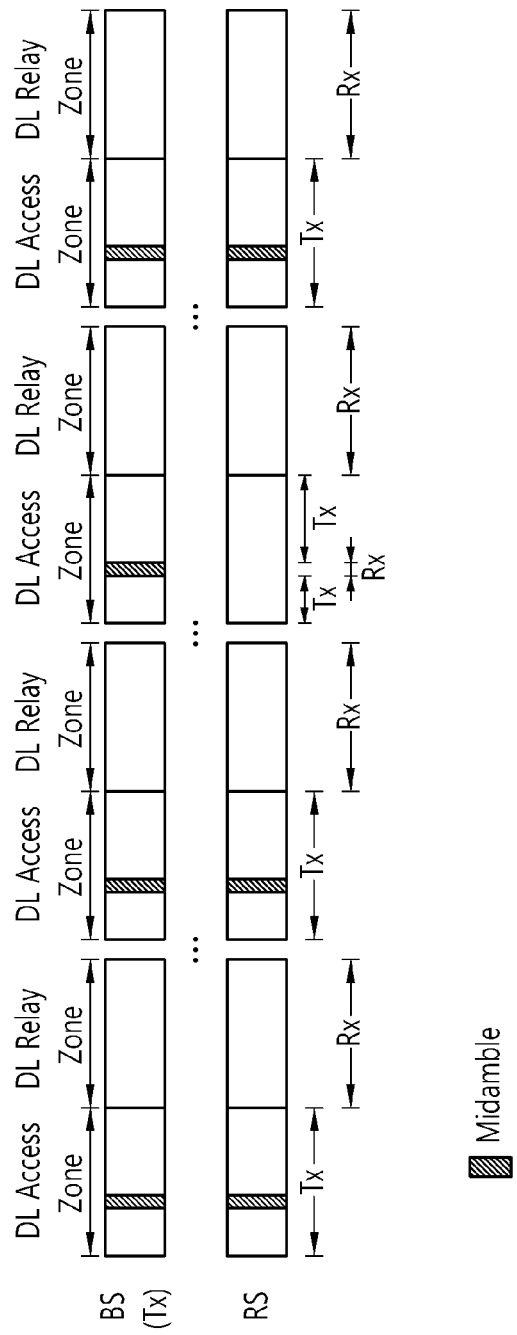
FIGS. 8 and 9 show an example of transmitting a midamble according to the proposed invention.

FIG. 8 shows an example of transmitting a midamble according to the proposed invention. This is a case where, when a midamble of a BS exists in a DL access zone of an RS, the RS receives the midamble of the BS one time per superframe. The RS does not transmit a midamble of the RS to an MS connected to the RS in a third frame, but receives the midamble of the BS. In this case, only the midamble of the BS may be received, or a preamble transmitted by the BS may be received together. The RS can operate as a receiver for receiving a signal in a part near an OFDMA symbol on which a midamble is transmitted in the third frame, and can operate as a transmitter for transmitting a signal in the remaining parts of the frame. Meanwhile, although not shown in FIG. 8, a transition gap exists between Tx and Rx or between Rx and Tx.

A subframe in which a midamble is received may exist in any frame. However, the subframe is preferably located in a frame not having an SFH. In addition, in order to read PA-preamble information together, the midamble is preferably received in a frame in which a PA-preamble is transmitted. Instead of receiving the PA-preamble, a transition may occur after the RS performs transmission so as to receive a midamble.

2) When a Midamble of a Bs Exists in a DL Delay Zone of an RS

Figure 9:
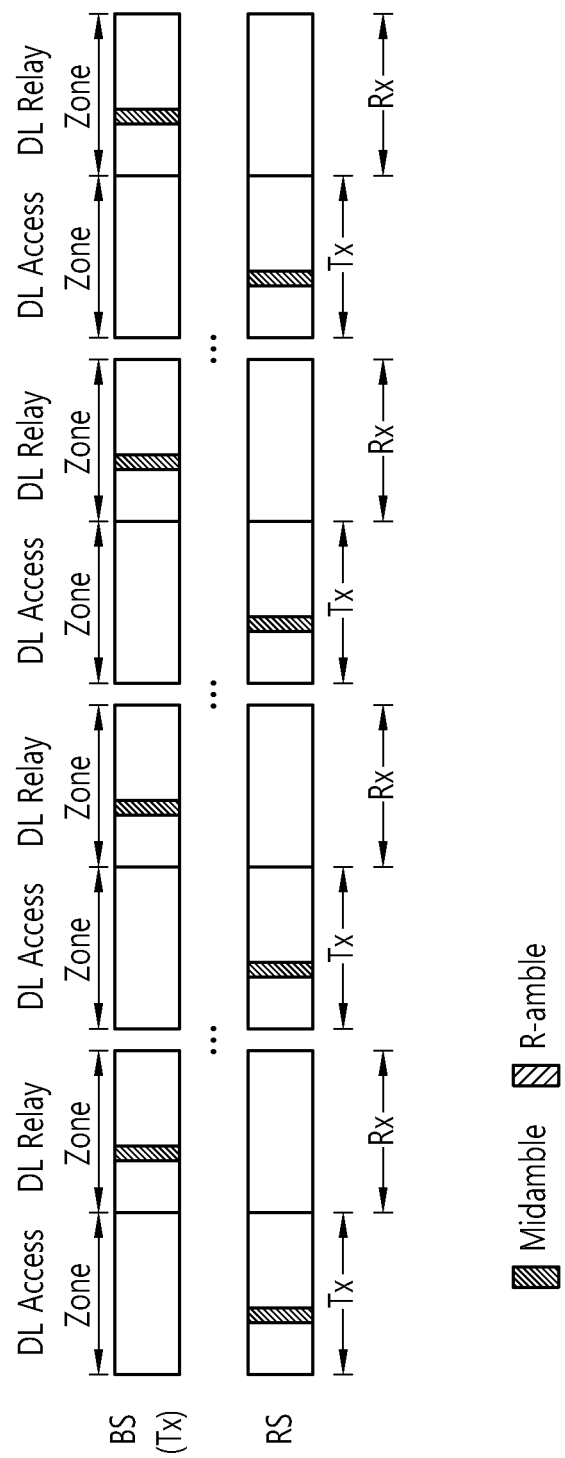

FIG. 9 shows an example of transmitting a midamble according to the proposed invention. This is a case where a midamble of a BS is received in a DL relay zone of an RS and a midamble of the RS is transmitted in a DL access zone. Although not shown in FIG. 9, a transition gap exists between Tx and Rx.

If the midamble of the BS exists in the DL relay zone of the RS, that is, in a duration in which the RS performs reception, the RS can read the midamble of the BS. In this case, for MSs that receive a service of the RS, the midamble of the RS is transmitted in a DL access zone. However, it may be difficult to measure interference.

Figure 10:
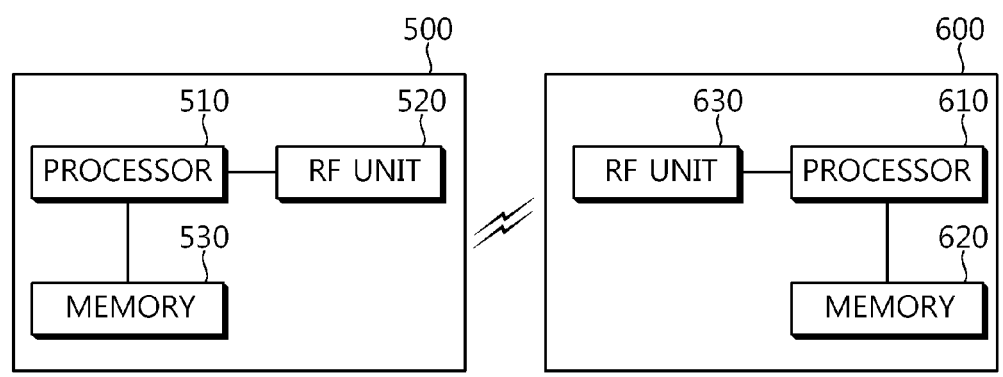
FIG. 10 shows a structure of an RS and a BS according to the present invention.

FIG. 10 shows a structure of an RS and a BS according to the present invention.

A BS 500 includes a processor 510, a memory 530, and a radio frequency (RF) unit 520. The processor 510 performs scheduling to allocate a radio resource to an RS and to receive a signal from the RS. The processor 510 can implement procedures, methods, and functions performed by the BS in the aforementioned embodiments. The memory 530 is coupled to the processor 510, and stores a variety of information for driving the processor 510. The RF unit 520 is coupled to the processor 510 and transmits and/or receives a radio signal.

An RS 600 includes a processor 610, a memory 620, and an RF unit 620. The processor 610 can implement procedures, methods, and functions performed by the RS in the aforementioned embodiments. The memory 620 is coupled to the processor 610, and stores a variety of information for driving the processor 610. The RF unit 630 is coupled to the processor 610 and transmits and/or receives a radio signal.

The processors 510, 610 may include application-specific integrated circuit (ASIC), other chipset, logic circuit and/or data processing device. The memories 520, 620 may include read-only memory (ROM), random access memory (RAM), flash memory, memory card, storage medium and/or other storage device. The RF units 530, 630 may include baseband circuitry to process radio frequency signals. When the embodiments are implemented in software, the techniques described herein can be implemented with modules (e.g., procedures, functions, and so on) that perform the functions described herein. The modules can be stored in memories 520, 620 and executed by processors 510, 610. The memories 520, 620 can be implemented within the processors 510, 610 or external to the processors 510, 610 in which case those can be communicatively coupled to the processors 510, 610 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alter-

What is claimed is:

1. A method of communicating by a base station in a wireless communication system including a relay station, the method comprising:
configuring, by the base station, a downlink (DL) access zone for communicating with a mobile station and a DL relay zone for communicating with the relay station or the mobile station;
transmitting, by the base station, a multiple-input multiple-output (MIMO) midamble for the mobile station in the DL access zone; and
when an R-amble indicator is included in a specific field in a DL message, transmitting, by the base station, an R-amble for the relay station in the DL relay zone, the R-amble being an additional MIMO midamble for the relay station, the R-amble indicator indicating whether or not the R-amble should be transmitted in the DL relay zone;
wherein, if the R-amble indicator is set with a specific value, the R-amble is to be transmitted;
wherein the R-amble indicator is transmitted to the mobile station through a secondary-superframe header (S-SFH) SP2.

2. The method of claim 1, wherein the R-amble indicator is transmitted to the relay station through an ARS-CONFIG-CMD message.

3. The method of claim 1, wherein a transmission period of the R-amble is at least one frame.

4. The method of claim 1, wherein the R-amble is included in a DL relay zone of a first frame of each superframe.

5. The method of claim 1, wherein the R-amble occupies a dedicated symbol pre-allocated in the DL relay zone.

6. An apparatus configured to transmit data in a wireless communication system, the apparatus comprising:
a radio frequency (RF) unit receiving configured to transmit or receive a radio signal; and
a processor coupled to the RF unit,
wherein the processor is c configured to:
configure a downlink (DL) access zone for communicating only with a mobile station and a DL relay zone for communicating with the relay station or the mobile station;
transmit a multiple-input multiple-output (MIMO) midamble for the mobile station in the DL access zone; and
when an R-amble indicator is included in a specific field in a DL message, transmit an R-amble for the relay station in the DL relay zone, the R-amble being an additional MIMO midamble for the relay station, the R-amble indicator indicating whether or not the R-amble should be transmitted in the DL relay zone;
wherein, if the R-amble indicator is set with a specific value, the R-amble is to be transmitted;
wherein the R-amble indicator is transmitted to the mobile station through a secondary-superframe header (S-SFH) SP2.

7. The apparatus of claim 6, wherein the R-amble indicator is transmitted to the relay station through an ARS-CONFIG-CMD message.

8. The apparatus of claim 6, wherein a transmission period of the R-amble is at least one frame.

9. The apparatus of claim 6, wherein the R-amble is included in a DL relay zone of a first frame of each superframe.

10. The apparatus of claim 6, wherein the R-amble occupies a dedicated symbol pre-allocated in the DL relay zone.

* * * * *